Inventor
Donald R. Barton
Attorney

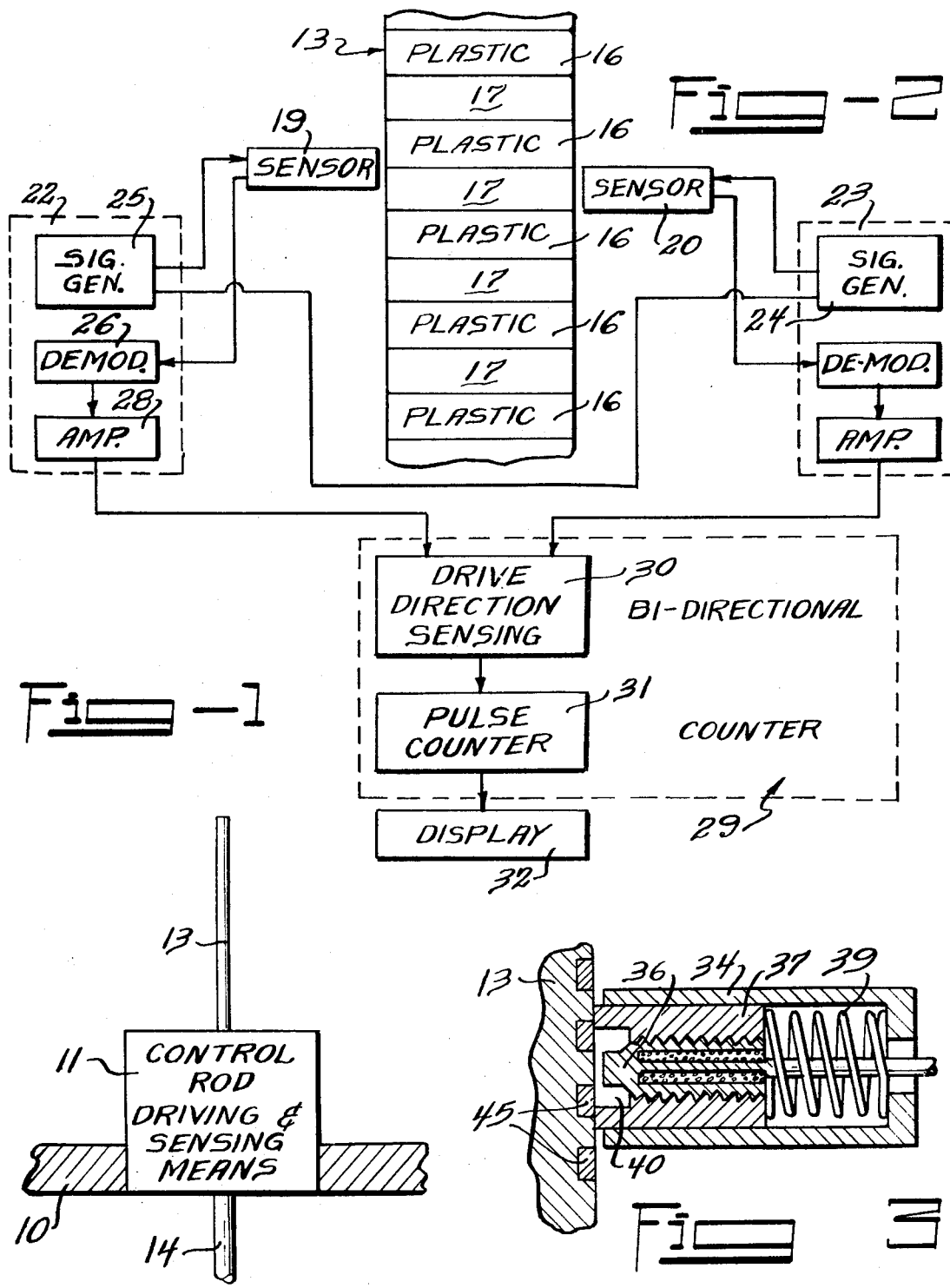

United States Patent Office 3,649,450
Patented Mar. 14, 1972

3,649,450
CONTROL ROD POSITION INDICATION SYSTEM
Donald R. Barton, Idaho Falls, Idaho, assignor to the United States of America as represented by the United States Atomic Energy Commission
Filed Mar. 4, 1970, Ser. No. 16,506
Int. Cl. G21c 17/00
U.S. Cl. 176—19      1 Claim

ABSTRACT OF THE DISCLOSURE

The position and motion of a control rod are measured by pulse techniques. The magnetic properties of the control rod are varied along its length and the rod forms part of the magnetic circuit of a sensing device. Motion of the rod causes changes in the magnetic structure of the sensing device to develop pulses which are processed by standard pulse techniques.

CONTRACTUAL ORIGIN OF THE INVENTION

The invention described herein was made in the course of, or under, a contract with the United States Atomic Energy Commission.

BACKGROUND OF THE INVENTION

The rods used to control the operation of nuclear reactors consist of a neutron-absorbing section connected to a driving section which is used to move the neutron-absorbing portion into the desired position. In order to properly control the reactor, it is necessary to know the position of the control rods at all times, particularly when the rod is in its top or bottom position. Limit switches which are actuated at the top and bottom positions have been used to indicate that the rods are at their limits of travel. Sensing in this manner provides the elapsed time of rod travel but makes impossible the time correlation of instantaneous position with measured reactive parameters, such as reactivity, power level and fuel temperature. When only limit switches are used, it is not possible to accurately and quickly set the control rods in intermediate positions. Analog sensing techniques, such as electrical slide wires or coils, have been made part of the rods and by connecting the coil or slide wire as part of a bridge circuit, it is possible to measure the intermediate positions of the rod. However, such techniques have not been completely satisfactory, as the structure is relatively complex, particularly if circuits for automatically balancing the bridge are used. Also nonlinearities and mechanically induced noise in the sensing devices result in inaccurate measurements. Additionally, with some measuring devices it is necessary to restrict the rod movement so that the rod cannot be rotated during movement, thus further complicating the rod structure.

It is therefore an object of this invention to provide an improved control rod position measuring structure.

Another object of this invention is to provide a control rod position measuring structure which measures both the position and direction of motion of the control rod.

Another object of this invention is to provide a control rod position measuring structure in which the measurements are independent of any control rod rotation.

SUMMARY OF THE INVENTION

In practicing this invention, the driving portion of the control rod is formed of a metal, usually stainless steel. A plurality of equally spaced grooves are cut in the surface of the rod and these grooves are filled with a material having magnetic properties different from the rod material, such as an epoxy plastic. Sensors are placed adjacent the rod so that the rod forms part of the magnetic structure of the sensor. An alternating current signal is coupled to the sensor and the output of the sensor is coupled to the measuring circuit. As the driving portion of the rod moves past the sensor, the magnetic structure of the sensor varies and output pulses are developed which are counted by measuring circuits. By suitable selection of the size and spacing of the grooves, the exact position of the rod can be measured to a desired accuracy. In order to determine the direction of motion, a pair of sensors are used with the center lines of the sensors being offset by a distance equal to one-half of the groove spacing. The signals from the two sensors are 90 electrical degrees apart and the sensor which develops the leading signal is determined by the direction of motion.

BRIEF DESCRIPTION OF THE DRAWINGS

The invention is described in the drawings, of which:

FIG. 1 is a view of a reactor control rod structure showing the neutron-absorbing section and the control-rod-driving section;

FIG. 2 is a block diagram of the control-rod-position-indicating system;

FIGS. 3 and 4 illustrate the structure of the sensing devices;

DETAILED DESCRIPTION OF THE INVENTION

Figure 4:
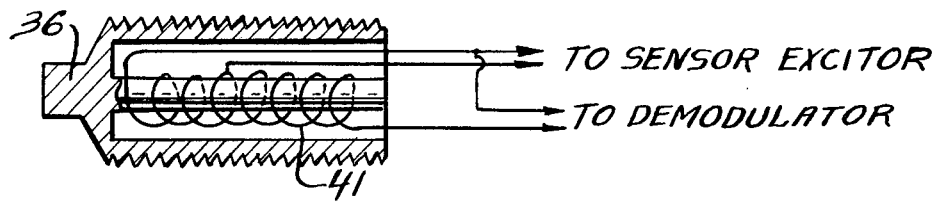

Referring to FIG. 1, there is shown the wall of a reactor 10 having a control-rod-driving and sensing means 11 therein. The control rod consists of a driving section 13 and a neutron-absorbing section 14. The control-rod-driving means includes devices for moving rod sections 13 and 14 up and down as desired. This can be done, for example, hydraulically or electrically by means well known in the art.

Referring to FIG. 2, there is shown the sensing means used to determine the position of the control-rod-driving section 13. Control-rod-driving section 13 has alternate rings of plastic 16 and metal 17. Sensors 19 and 20 are placed adjacent driving section 13 so that driving section 13 is part of the magnetic structure of sensors 19 and 20. Sensor 19 is coupled to a signal circuit 22 and sensor 20 is coupled to a signal circuit 23. Signal circuits 22 and 23 are substantially identical and the operation of only one of the circuits will be described.

A signal generator 25 is coupled to sensor 19 and a signal generator 24 is coupled to sensor 20 to provide alternating currents therefor. Signal generators 24 and 25 are coupled together so that their output signals are the same frequency with a desired phase relationship or they may be the same signal generator. This alternating current is coupled to a demodulator 26 through sensor 19, with the magnitude of the signal applied to demodulator 26 being determined by the magnetic coupling between the inputs and outputs of sensor 19. The degree of magnetic coupling is determined by the magnetic circuit of sensor 19 which, in turn, is determined by the position of driving section 13.

When the control-rod-driving portion 13 moves, the magnitude of the alternating current signal applied to demodulator 26 varies according to the speed of movement. These changes in magnitude are detected by demodulator 26 and appear as pulses which are coupled to amplifier 28. The output of amplifier 28 is coupled to a bidirectional counter 29. The pulses from sensor 20 are also coupled, through the signal circuit 23, to the bi-directional counter 29. Counter 29 can be a known counter which counts in one of two directions according to the electrical angle between the pulses from signal circuits 22 and 23. The pulses from signal circuits 22 and 23 are compared in the drive direction sensing circuit 30 of counter 29 and the electrical angle between the pulses is measured to determine the direction of motion of the control-rod-driving section 13. The number of pulses developed are counted by a pulse counter 31 in bi-directional counter 29 to determine the distance the control-rod-driving portion has moved. The position of the control rod can thus be displayed as a number, showing the distance of the control rod from some point of origin. This display can be by electrically operated numerical display devices 32 which are well known. In an example of a reactor using this system, the control rod movement was 77 inches and a number from 0 to 77 would be shown on display 32. When the control rod is at its top position, the number displayed would be 0 and, when it is at its bottom position, the number displayed would be 77. Intermediate positions are shown by intermediate numbers.

Referring to FIGS. 3 and 4, there is shown a cross-sectional view of the sensors used and also a cross-sectional view of the control-rod-driving section 13. The sensor consists of an outer shield 34 which is held in position adjacent the control-rod-driving section. A magnetic portion 36 containing the input and output circuits is held within shield 34 by positioning structure 37. A spring 39 biases the positioning structure 37 and the magnetic structure 36 toward the control-rod-driving section 13. The distance 40 between the magnetic structure 36 and control-rod-driving section 13 is adjusted by screwing the magnetic structure 36 into or out of the positioning structure 37. The electrical portion of the sensor consists of an autotransformer winding 41 which has an input connected to the sensor exciter or signal generator 25 and an output connected to the demodulator 26.

In manufacturing the control-rod-driving section 13, grooves 44 are cut in the rod and filled with a plastic 45. Grooves 44 are cut so that the width of the grooves is the same as the distance between the grooves. The plastic used should be suitable for finish grinding after fabrication and the hardness and thermal expansion should closely match that of the control rod material as well as having different electrical and magnetic properties. An epoxy plastic is particularly suited for this application and in a structure where the control-rod-driving section was stainless steel a polyurethane base epoxy was used.

Figure 6:
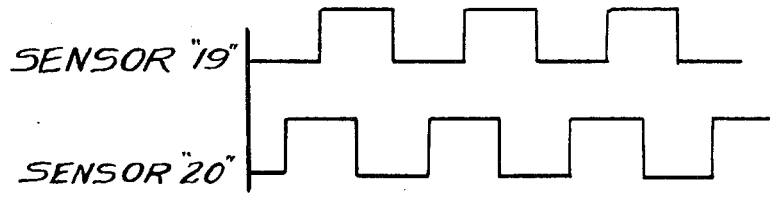
FIGS. 6 and 7 illustrate the pulses developed by the offset sensors.
Figure 7:
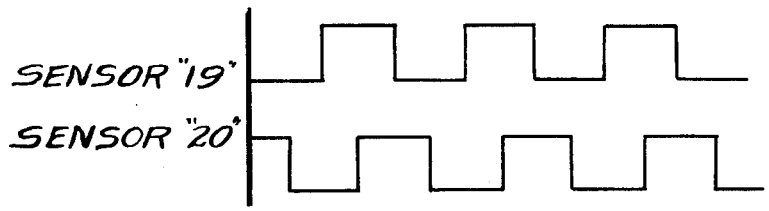
Figure 5:
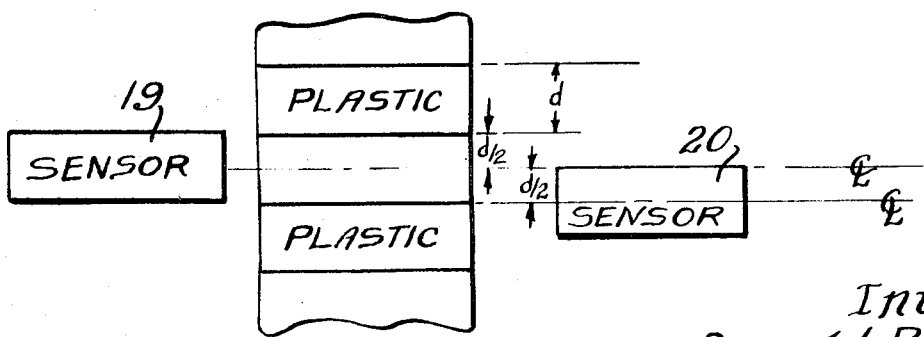
FIG. 5 illustrates the offset spacing of the sensors.

Referring to FIG. 5, it can be seen that sensors 19 and 20 are offset from each other one-half the distance between the grooves. The resulting signal developed because of this offset is shown in FIGS. 6 and 7. In FIG. 6, it can be seen that the pulses developed by sensor 19 lag the pulses developed by sensor 20 by 90 electrical degrees. In FIG. 7, the pulses are shown with the rod moving in a direction opposite to that which developed the pulses of FIG. 6. It can be seen that the pulses developed by sensor 19 lead the pulses developed by sensor 20 by 90 electrical degrees. By measuring the angle between the pulses, the direction of motion of the control rod is determined.

Thus, a simple measuring structure for a reactor control rod has been shown. The measuring system develops a pair of pulse trains and counts the pulses in the pulse trains to determine rod position. The angle between the pulses in the two pulse trains indicates the direction of motion of the control rod. By this means, simplified measuring and counting circuits can be used, the structure of the control rod is simple and symmetrical so that measurements are independent of any rotation of the control rod.

The embodiments of the invention in which an exclusive property or privilege is claimed are defined as follows:

1. A system for measuring the position of a nuclear reactor control rod, including in combination, driving means for moving the control rod in and out of the reactor, said reactor control rod having a driving section coupled to said driving means and a neutron-absorbing section, said driving section being formed of stainless steel and having a plurality of spaced-apart circumferential grooves formed therein, said grooves being filled with an epoxy plastic so that the magnetic properties of said plastic-filled grooves are different from the magnetic properties of said driving section, the width of said grooves being equal to the space between said grooves, first and second sensors positioned adjacent said driving section so that said driving section forms a part of the magnetic structure of said first and second sensors, signal generation means coupled to said first and second sensors for applying a sensor signal thereto, said driving means acting to position said driving section in a desired position with said plastic-filled grooves being moved past said first and second sensors as the position of said driving section is changed, said first and second sensors acting to develop first and second output pulse signals respectively in response to said motion of said grooves, said first and second sensors being positioned so that their center lines are at substantially right angles to the axial center line of said driving section with the center line of said first sensor being offset from the center line of said second sensor by a predetermined amount so that said first and second output pulse signals differ in phase, output means coupled to said first and second sensors, said output means including counter means for counting said first and second output pulse signals to measure the magnitude of the motion of said driving section, said output means further including means for measuring the phase angle between said first and second pulse output signals to determine the direction of the motion of said driving section.

References Cited

UNITED STATES PATENTS 2,875,524  3/1959  Bower et al. _____ 340—195

JOHN W. CALDWELL, Primary Examiner
M. SLOBASKY, Assistant Examiner

U.S. Cl. X.R.
340—271, 282